UNITED STATES PATENT OFFICE.

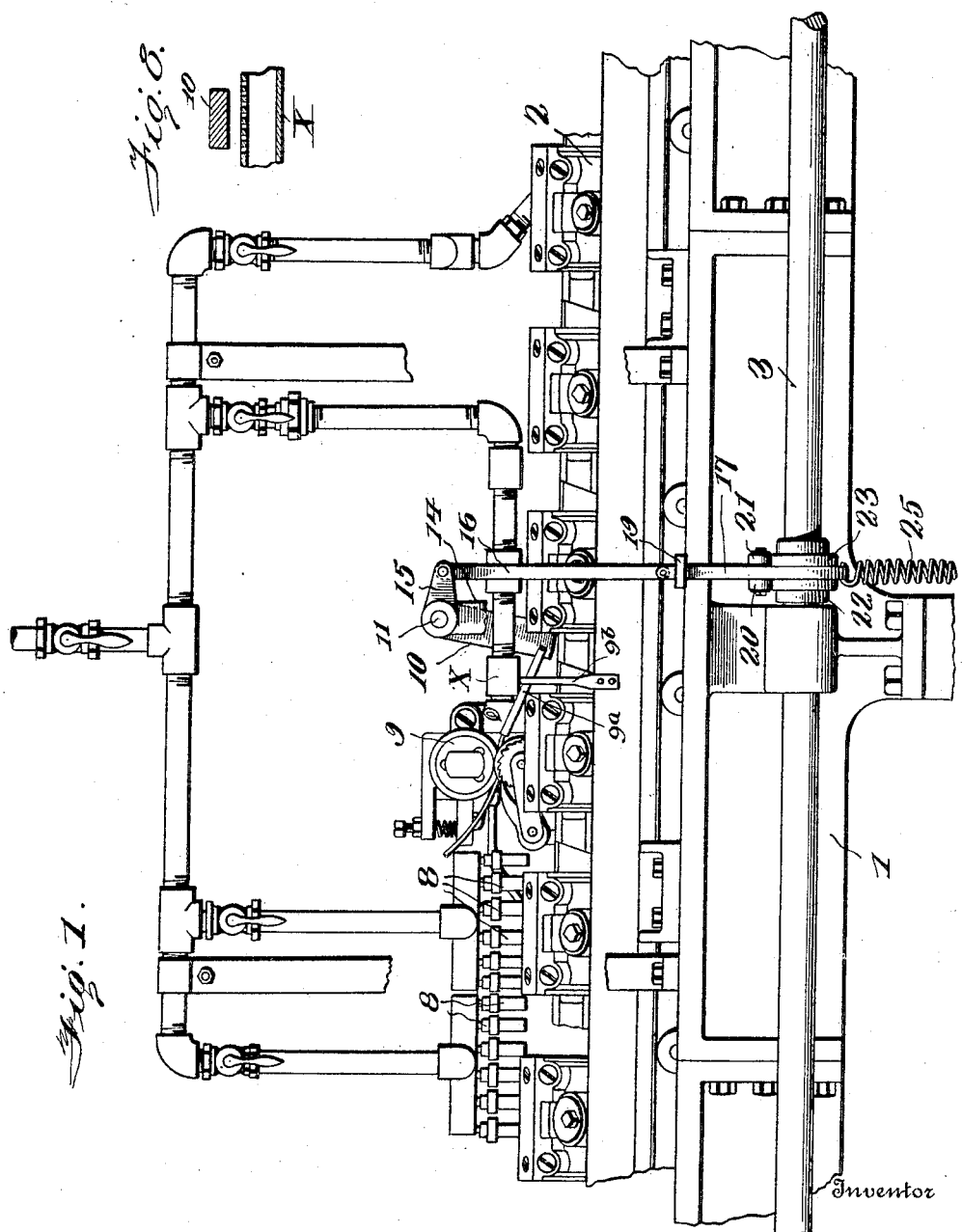

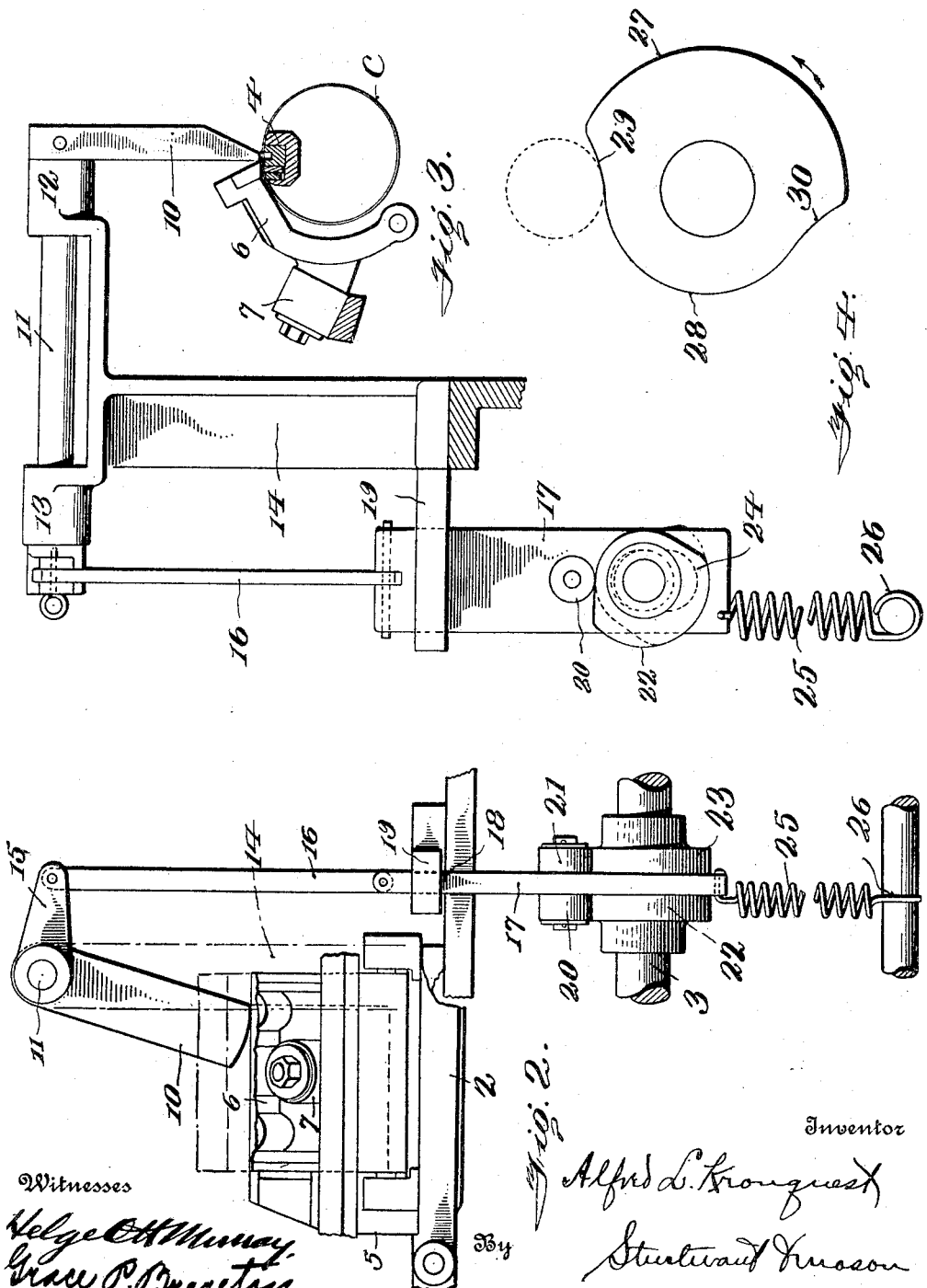

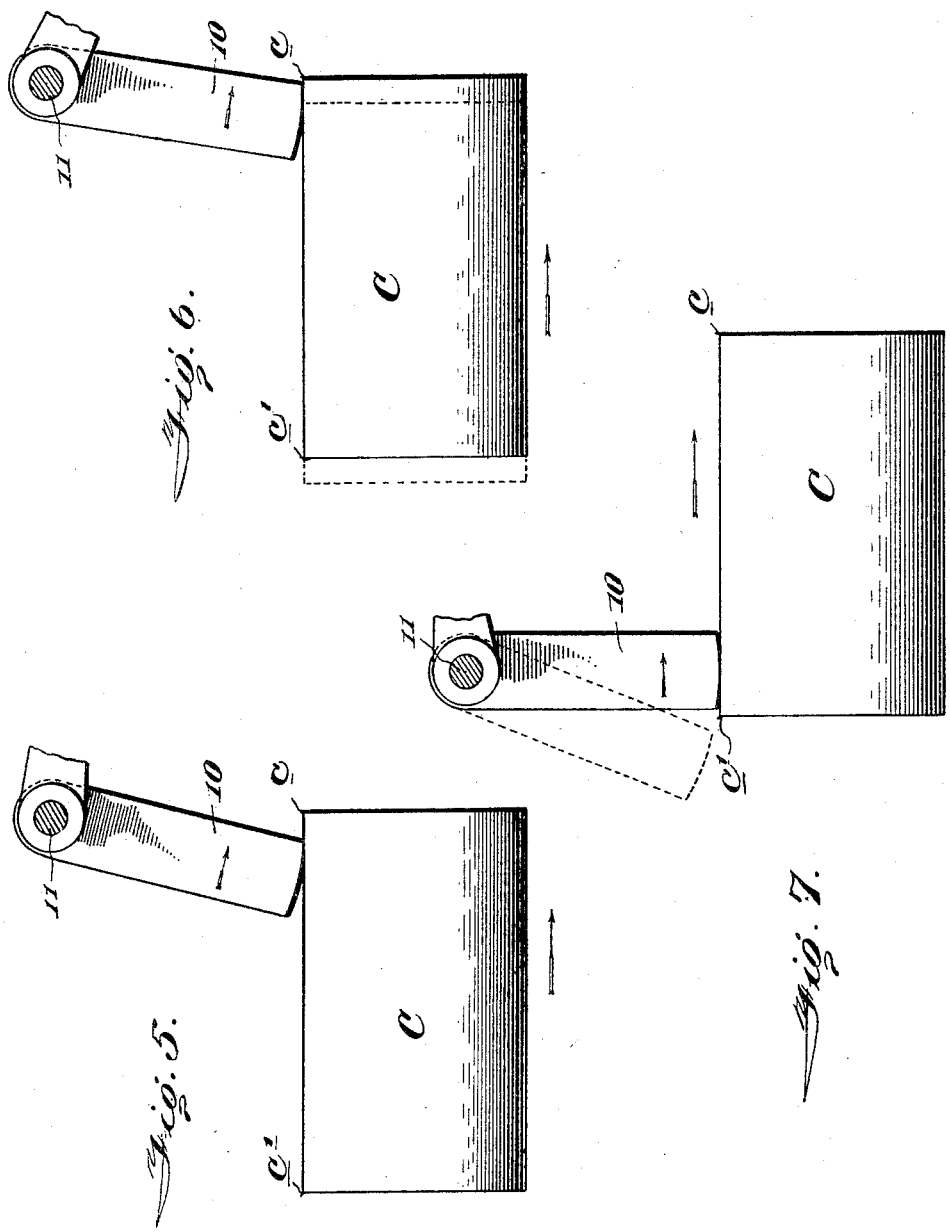

ALFRED L. KRONQUEST, OF CHICAGO, ILLINOIS, ASSIGNOR, BY MESNE ASSIGNMENTS, TO CONTINENTAL CAN COMPANY, INC., A CORPORATION OF NEW YORK.

SOLDERING-MACHINE.

1,210,177.  Specification of Letters Patent.  Patented Dec. 26, 1916.

Application filed September 27, 1912.   Serial No. 722,698.

*To all whom it may concern:*

Be it known that I, ALFRED L. KRONQUEST, a citizen of the United States, residing at Chicago, in the county of Cook, State of Illinois, have invented certain new and useful Improvements in Soldering-Machines, of which the following is a description, reference being had to the accompanying drawing and to the figures of reference marked thereon.

The invention relates to new and useful improvements in soldering machines, and more particularly to machines of this character for soldering the side seam of a can body.

In the making of the side seam of a can body, it is desirable that the solder for joining the edges of the side seam shall not extend beyond the outer ends of the seam, or inside of the can body, as this accumulation of solder at the ends prevents the making of the proper double seam when the end is rolled into said double seam, and also prevents the making of a close joint where an end is slipped on to the can body and subsequently soldered. This accumulation of solder at the end of the seam and inside the can is caused by the iron sliding off the end of the metal.

An object of the invention is to provide means for distributing and "sweating in" the solder along the side seam, so that the solder may be applied entirely on the outside of the side seam within the limits of the ends.

A further object of the invention is to provide a device of the above character, which includes a swinging soldering iron so positioned and manipulated relative to the travel of the can body that the iron engages the can body at a point in rear of the advance end of the side seam.

A further object of the invention is to provide a device of the above character, wherein the swinging arm is caused to leave the can body at a point in advance of the rear end of the side seam.

These and other objects will in part be obvious, and will in part be hereinafter more fully disclosed.

In the drawings, which show by way of illustration one embodiment of the invention,—Figure 1 is a side elevation of a portion of a side seaming machine embodying my improvements; Fig. 2 is an enlarged detail showing one of the traveling carriages, the horn carried thereby and the swinging soldering iron in side elevation; also the mechanism for operating the swinging soldering iron; Fig. 3 is a transverse sectional view, showing the soldering iron, the horn, the can body, and the means for swinging the soldering iron; Fig. 4 is an enlarged detail of the cam for operating the soldering iron; Fig. 5 is a diagrammatic view, showing the position of the soldering iron when first contacting with the can body; Fig. 6 is a similar view, showing the movement of the soldering iron to a point adjacent the advanced end of the side seam; and Fig. 7 is a similar view, showing the soldering iron at a point where it is swung from contact with the can body. Fig. 8 is a detail in section through the soldering iron and the heating pipe therefor.

I have shown my improved soldering mechanism as applied to a lap seam body maker of the general character shown and described in a patent granted to Jesse E. Abrams, February 15th, 1910, No. 949,722, the manner of shaping the can body, the traveling carriages and horns for supporting the can bodies, being similar in a general way to those shown in said patent. It will be understood, however, that my improved soldering iron may be used in connection with other types of soldering mechanism, as for example, where the can end or head is slipped on to the can body and subsequently soldered, and also other types of side seaming devices wherein the edges forming the side seam are interlocked rather than overlapped.

The machine consists of a main frame or table 1, which is suitably supported, and along which are caused to travel carriages 2, which are connected together so as to form an endless traveling carrier for the can bodies. Extending along the side of the table is a shaft 3, which is driven in timed relation to the travel of the carriages.

Each of the carriages is provided with a supporting horn 4, which is carried by and projects from the standard 5 mounted on the carriage. Also mounted on each carriage is a swinging jaw 6. This swinging jaw is moved about its pivotal support by a roller 7, and is caused to clamp the can body C with its edges properly gaged and overlapped against the horn 4.

In Fig. 3 of the drawing, I have shown the can body extending about the horn and the side edges overlapped and clamped by the swinging jaw 6. As each carriage passes the forming station, a blank is curled and placed on the horn, which supports the formed can body and presents the same to the fluxing station, then to the preheating station and finally to the soldering station.

In Fig. 1 of the drawing, I have shown the preheating station which consists of a series of gas jets 8. Solder is supplied by a solder-feeding device 9, which is of the usual construction. The solder is applied to the side seam by my improved soldering mechanism.

This improved soldering mechanism consists, as herein illustrated, of a swinging soldering iron 10, which is rigidly fixed to a shaft 11 mounted in bearings 12 and 13 carried by a bracket 14, mounted on the main frame or table 1. The soldering iron is heated by the usual perforated gas pipe, indicated at X in the drawings. The solder, after passing through the solder feeding devices 9, is fed through a guiding pipe 9$^a$ carried by a bracket 9$^b$, which may be of the usual construction. This guides the solder onto the hot iron. At the opposite end of the shaft 11 is a projecting arm 15, which is connected by a link 16 to a slide 17. This sliding member 17 is mounted for vertical movement in a slot 18, in a projecting arm 19 carried by the bracket 14. The slide member 17 is provided with rollers 20 and 21, which are located on opposite sides thereof, and which coöperate with cams 22 and 23 respectively. These cams 22 and 23 are mounted on the shaft 3. The slide member 17 is formed with a slot 24, which straddles the shaft 3, and serves to guide the member in its vertical movement. A spring 25 is secured at one end to the sliding member 17, and at its other end to a suitable stationary pin 26. This spring normally holds the rollers 20 and 21 in contact with the cams 22 and 23. The cams 22 and 23 are alike in construction, and are each provided with a concentric part 27 and a concentric part 28. These concentric parts are connected by slightly concave eccentrically located parts 29 and 30.

When the rollers are resting on the concentric part 27, the outer end of the arm 15 will be raised, and the iron 10 swung so as to engage the can body on the horn passing underneath the same. When these rollers are in contact with the concentric part 28, the spring 25 will depress the outer end of the arm 15 and raise the swinging iron out of contact with the can body.

In the operation of my invention, the can bodies as above noted, are formed and clamped to each horn as they pass through the forming station. The horns in a machine of this type will pass in turn past the soldering iron. The cams 22 and 23 are so timed as to hold the swinging iron 10 raised from contact with the can body, as the advance end of the can body passes underneath the iron.

In Fig. 5 of the drawing, I have shown the can body C as moving in the direction of the arrow. After the advance end $c$ of the side seam has passed the soldering iron 10, the cam raises the arm 15 and positively and quickly swings the soldering iron in the same direction as the direction of travel of the can body C. The iron will also travel slightly faster than the movement of the can body, and, therefore, when the can body is moved from the dotted line position in Fig. 6 to the full line position therein, the iron has reached a point adjacent the advance end of the side seam, but slightly in rear thereof.

The iron remains stationary in the position shown in Fig. 6 for a time, as the rollers 20 and 21 are now traveling on the eccentric portions 27 of the cams. As soon as the rear edge $c'$ reaches a point adjacent the soldering iron, the rollers 20 and 21 will pass down the inclined or eccentric portions 30 of the cams, and the iron will be quickly swung from contact with the can bodies.

Inasmuch as the active end of the iron is slightly curved, as soon as the iron begins to swing, the heel thereof or rear edge, will be raised from the can body, and the iron will be brought out of contact with the can body without drawing the same over the extreme rear edge $c'$ of the end seam.

From the above description, it will be apparent, that I have provided a construction wherein a soldering iron is brought into engagement with a can body at a point in rear of the advance end of the side seam thereof, and leaves the can body at a point in advance of the rear end of the side seam, and, therefore, the iron at no time slides over either end of the side seam, and all liability of carrying solder inside of the can body, or causing the solder to accumulate at the end of the seam through the scraping effect of the edge of the metal, as the iron slides up on to the same, is avoided.

I am able by my construction to solder a side seam and avoid all objectionable accumulation of the solder at either end of the seam, and thereby greatly increase the efficiency of the double seams formed at the ends of the can bodies, and facilitate the putting on of ends which are to be soldered thereafter.

While I have shown a swinging soldering iron for accomplishing the above result, it will be apparent that other forms of devices may be used, the essential feature being the applying of the solder as described in detail above.

While I have also described my improved soldering mechanism as especially adapted for soldering lap seams, it will be obvious from certain aspects of the invention, that the swinging soldering iron may also be used in connection with interlocked or folded side seams.

Having thus described my invention, what I claim as new and desire to secure by Letters Patent, is:—

1. A soldering machine including in combination, means for supporting and continuously traveling a can body, and means for applying solder to the side seam of the can body, said last-named means including a soldering iron, and means for moving the soldering iron into initial contact with the can body in rear of the advance edge of the side seam and during the travel thereof.

2. A soldering machine including in combination, means for supporting and continuously traveling a can body, and means for applying solder to the side seam of the can body, said last-named means including a soldering iron, and means for moving the soldering iron into initial contact with the can body in rear of the advance edge of the side seam and during the travel thereof, and for moving said iron out of contact with the can body at a point in advance of the rear end of the side seam.

3. A soldering machine including in combination, means for supporting and moving endwise a can body, and means for applying the solder to the side seam thereof, said means including a soldering iron, means for moving said iron into initial contact with the can body at a point in rear of the advanced end of the side seam, and to cause said iron to travel with the can body and at a greater speed than the can body until said iron is brought to a point directly in rear of the advanced end of the side seam, and to dwell while the can body is passing underneath the same.

4. A soldering machine including in combination, means for supporting and moving endwise a can body, means for applying the solder to the side seam thereof, said means including a soldering iron, means for moving said iron into initial contact with the can body at a point in rear of the advanced end of the side seam, and to cause said iron to travel with the can body and at a greater speed than the can body until said iron is brought to a point directly in rear of the advanced end of the side seam, and to dwell while the can body is passing underneath the same, and for causing said iron to be retracted from the can body at a point directly in advance of the rear end of the side seam.

5. A soldering machine including in combination, a plurality of traveling horns, means for clamping a can body on each horn with the side edges thereof overlapping, means for soldering said overlapped edges including a soldering iron, and means for moving said soldering iron into initial contact with the can body at a point in rear of the advanced end of the side seam.

6. A soldering machine including in combination, a plurality of traveling horns, means for clamping a can body on each horn with the side edges thereof overlapping, means for soldering said overlapped edges including a soldering iron, means for moving said soldering iron into initial contact with the can body at a point in rear of the advanced end of the side seam, and for causing said iron to travel with the can body and at a greater speed than the can body until the iron has reached a point directly in rear of the advanced end of the side seam, and to dwell while the can body is passing underneath the same.

7. A soldering machine including in combination, a plurality of traveling horns, means for clamping a can body on each horn with the side edges thereof overlapping, means for soldering said overlapped edges including a soldering iron, means for moving said soldering iron into initial contact with the can body at a point in rear of the advanced end of the side seam, and for causing said iron to travel with the can body and at a greater speed than the can body until the iron has reached a point directly in rear of the advanced end of the side seam, and to dwell while the can body is passing underneath the same, and means for causing said iron to be retracted from the can body at a point in advance of the rear end of the side seam.

8. A soldering machine including in combination, a plurality of traveling horns, means for clamping a can body on each horn with the side edges thereof overlapping, means for soldering said overlapped edges including a pivoted soldering iron mounted to swing about an axis at right angles to the plane of travel of the can body, and means for swinging said soldering iron, whereby the same is caused to initially contact with the can body at a point in rear of the advanced end of the side seam.

9. A soldering machine including in combination, a plurality of traveling horns, means for clamping a can body on each horn with the side edges thereof overlapping, means for soldering said overlapped edges including a pivoted soldering iron mounted to swing about an axis at right angles to the plane of travel of the can body, means for swinging said soldering iron, whereby the same is caused to contact with the can body at a point in rear of the advanced end of the side seam, and for causing said iron to travel in the direction of movement of the can body until in full contact therewith and to dwell while the can body is passing underneath the same.

10. A soldering machine including in combination, a plurality of traveling horns, means for clamping a can body on each horn with the side edges thereof overlapping, means for soldering said overlapped edges including a pivoted soldering iron mounted to swing about an axis at right angles to the plane of travel of the can body, means for swinging said soldering iron, whereby the same is caused to contact with the can body at a point in rear of the advanced end of the side seam, and for causing said iron to travel in the direction of movement of the can body until in full contact therewith and to dwell while the can body is passing underneath the same, and means for raising the iron from contact with the can body at a point in advance of the rear end of the side seam.

In testimony whereof, I affix my signature, in the presence of two witnesses.

ALFRED L. KRONQUEST.

Witnesses:
E. E. FINNEGAN,
A. M. GOODWIN.

Copies of this patent may be obtained for five cents each, by addressing the "Commissioner of Patents, Washington, D. C."